(12) United States Patent
McCallister et al.

(10) Patent No.: US 6,507,628 B1
(45) Date of Patent: Jan. 14, 2003

(54) DISTORTION-COMPENSATED DIGITAL COMMUNICATIONS RECEIVER AND METHOD THEREFOR

(75) Inventors: Ronald D. McCallister, Scottsdale, AZ (US); Bruce A. Cochran, Mesa, AZ (US)

(73) Assignee: SICOM, Inc., Scottsdale, AZ (US)

( * ) Notice: Subject to any disclaimer, the term of this patent is extended or adjusted under 35 U.S.C. 154(b) by 0 days.

(21) Appl. No.: 09/391,055

(22) Filed: Sep. 7, 1999

(51) Int. Cl.[7] ............................. H03D 1/00; H04L 27/06
(52) U.S. Cl. ...................... 375/341; 375/262; 375/254; 375/285; 714/796
(58) Field of Search ..................... 375/341, 254, 375/262, 265, 278, 284, 285; 714/796, 792, 794, 795

(56) References Cited

U.S. PATENT DOCUMENTS

| | | | |
|---|---|---|---|
| 4,660,214 A | 4/1987 | Pahlavan et al. | 375/262 |
| 4,742,533 A | 5/1988 | Weidner et al. | 375/331 |
| 5,233,629 A | 8/1993 | Paik et al. | 375/262 |
| 5,396,518 A | 3/1995 | How | 375/265 |
| 5,408,502 A | 4/1995 | How | 375/340 |
| 5,469,452 A | 11/1995 | Zehavi | 714/792 |
| 5,488,635 A | 1/1996 | Chennakeshu et al. | 375/340 |
| 5,905,743 A | 5/1999 | Ramesh | 714/795 |
| 5,912,908 A | 6/1999 | Cesari et al. | 714/795 |
| 6,005,897 A | * 12/1999 | McCallister et al. | 375/340 |
| 6,125,136 A | * 9/2000 | Jones et al. | 375/147 |

* cited by examiner

*Primary Examiner*—Mohammad H. Ghayour
(74) *Attorney, Agent, or Firm*—Lowell W. Gresham; Jordan M. Meschkow; Charlene R. Jacobsen (57) ABSTRACT

A digital communication transmitter (30) implements a phase constellation (40) which defines a digital communication signal stream that is subsequently compressed (50), thereby introducing distortion into a communication signal (56) transmitted to a complementary receiver (30). The receiver (30) includes a magnitude adjuster (80) which increases the magnitude component of selected phase estimates to at least partially compensate for the compression distortion. The receiver also includes a branch metrics generator (90) having a segment (138) in which branch metric transfer function peaks and valleys are not positioned in receiver phase space to coincide with ideal phase points. The branch metric transfer functions are generated in accordance with a process (102) which bases branch metric calculations upon empirically determined probabilities that characterize system-induced distortions.

21 Claims, 6 Drawing Sheets

DISTORTION-COMPENSATED DIGITAL COMMUNICATIONS RECEIVER AND METHOD THEREFOR

RELATED PATENTS

The present invention is related to U.S. patent application Ser. No. 09/143,230, filed Aug. 28, 1998, entitled: "A Constrained-Envelope Digital-Communications Transmission System and Method Therefor" by Ronald D. McCallister, Bruce A. Cochran, and Bradley P. Badke, which is incorporated herein by reference.

TECHNICAL FIELD OF THE INVENTION

This invention relates to digital communications. More specifically, the present invention relates to receiver circuits which compensate for system-induced distortions.

BACKGROUND OF THE INVENTION

Figure 1:
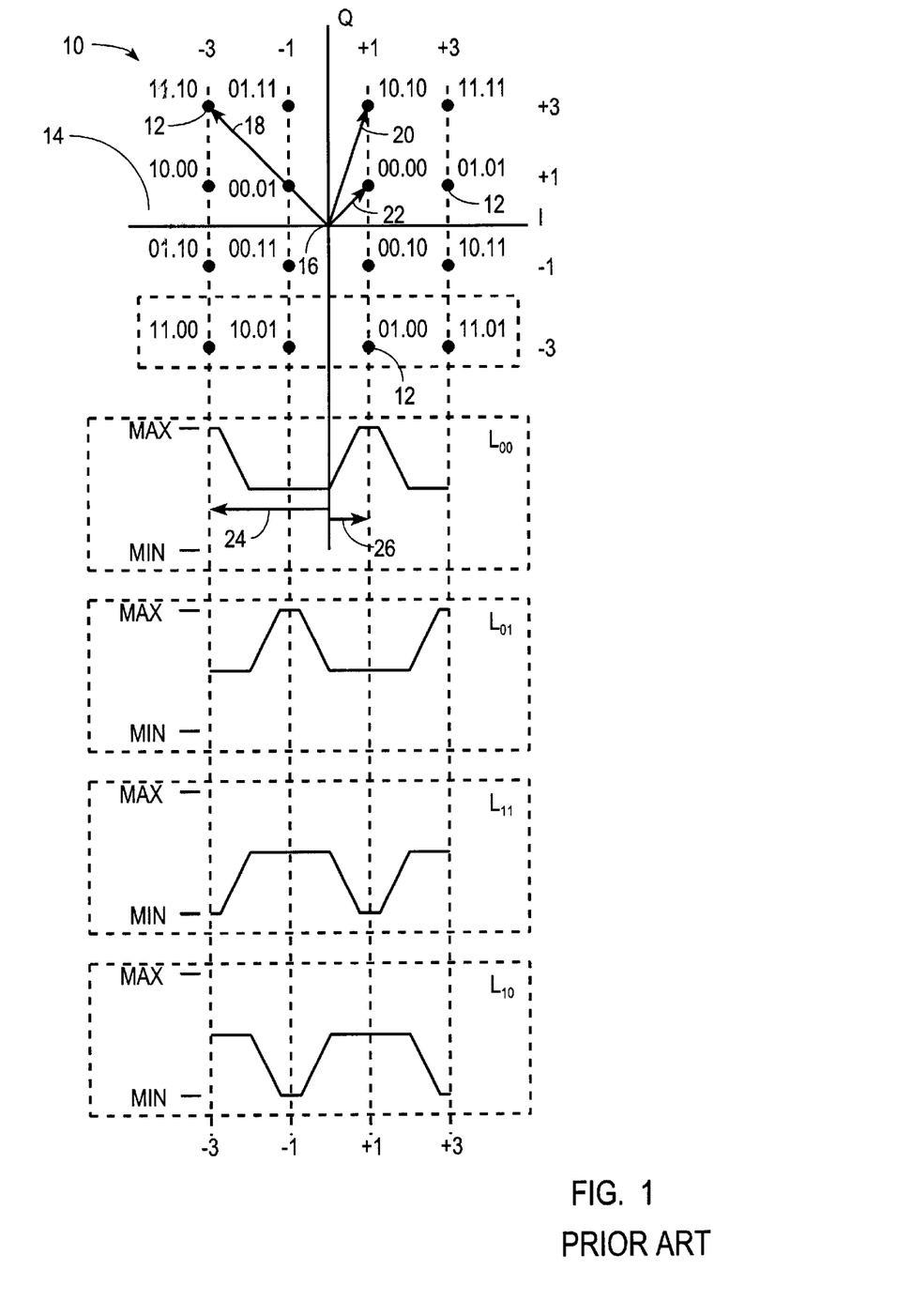
FIG. 1 shows a prior art transmitter-implemented phase constellation and corresponding transfer functions for receiver-implemented branch metric segments.

Conventional digital communication systems convey digital data in accordance with a transmitter-implemented phase point constellation. This constellation defines a finite number of phase states to be used in conveying data to a receiver. FIG. 1 shows an exemplary prior art transmitter-implemented constellation 10 configured in accordance with the well-known 16-QAM modulation technique. Sixteen phase points 12 reside in a phase space 14 at all combinations of −3, −1, +1, and +3 values of orthogonal in-phase (I) and quadrature (Q) components of a communication signal. In 16-QAM, phase points 12 reside at one of a greater, intermediate, or lesser magnitude away from an origin 16 of phase space 14, as indicated by magnitude vectors 18, 20, and 22, respectively. Moreover, in 16-QAM each phase point 12 has its own unique four-bit code. In the example depicted in FIG. 1, two bits to the right of a radix point in this four-bit code are encoded for the purposes of error correction, such as may occur through a convolutional encoder. During each unit baud interval, the communication signal conveys a single four-bit code.

A receiver then processes the communication signal to detect the four-bit code conveyed during each unit baud interval. Generally, the receiver detects transmitted data by comparing a phase estimate for a unit baud interval with data compiled in response to constellation 10. However, noise and other influences corrupt the received communication signal so that a received estimate may reside at any location in phase space 14 rather than the location from which transmission occurred.

The error correction encoding (e.g., the two least significant bits of the four-bit codes depicted in FIG. 1) is helpful in resolving the transmitted data. Error correction involves the translation of phase estimates in the receiver into log-likelihood ratios in a branch metrics generator, which are then fed to a decoder. Accordingly, the branch metrics generator transfer function plays an important role in correctly deciphering encoded data.

FIG. 1 illustrates an exemplary conventional branch metrics transfer function for the 16-QAM example. In particular, FIG. 1 graphically illustrates transfer functions for four segments of a branch metric generator at the Q=−3 contour of phase space 14. The four segments refer to respective branch metrics outputs ($L_{00}$, $L_{01}$, $L_{11}$, and $L_{10}$) which characterize the likelihoods that the two encoded bits convey values of 00, 01, 11, or 10 over each fundamental unit area of the receiver phase space. As illustrated in FIG. 1, the branch metrics transfer function experiences peaks and valleys at the same symbol group amplitude levels, e.g. −3, −1, +1, and +3 used in transmitter-implemented constellation 10. Consequently, the ratio of a greater magnitude peak 24 to a lesser magnitude peak 26 in the received phase space characterized in the branch metrics generator equals the ratio of maximum magnitude vector 18 to minimum magnitude vector 22 in transmitter-implemented constellation 10. While FIG. 1 illustrates only the well-known 16-QAM modulation technique, this conventional technique is universally applied, even with transmitter-implemented phase constellations that distribute outer phase points further apart from one another than inner phase points.

The use of equal symbol group amplitude levels in transmitter and receiver phase spaces, and the resulting equal ratios of greater to lesser magnitude phase points in transmitter and receiver, result at least in part from a random additive and multiplicative noise assumption employed in conventional digital communication receiver design. In short, conventional receivers and branch metric generators therein are designed using the assumption that a displacement of a received phase estimate from its ideal phase point is as likely to occur in one direction in phase space as in another, and that displacements of equal magnitude are equally likely for any phase point in the constellation, or at least for phase points having equal magnitude.

While the random noise assumption has produced acceptable results in prior digital communication receivers, digital communication performance requirements are evolving so that a need now exists to depart from this random noise assumption to achieve improved performance.

SUMMARY OF THE INVENTION

Accordingly, it is an advantage of the present invention that an improved distortion-compensated digital communications receiver and method are provided.

Another advantage is that a digital communication receiver is configured to accommodate non-random components of phase error as well as random components of phase error.

Another advantage is that a digital communication receiver has a branch metrics generator configured to accommodate non-random components of phase error as well as random components of phase error.

Another advantage is that a method is provided for calculating branch metrics to accommodate non-random components of phase error.

The above and other advantages of the present invention are carried out in one form by a distortion-compensated receiver for digital communication configured in accordance with a transmitter-implemented constellation having greater magnitude and lesser magnitude phase points. The ratio of a magnitude for the greater magnitude phase point divided by a magnitude for the lesser magnitude phase point is $R_{TX}$. The distortion-compensated receiver includes a phase estimator configured to supply phase estimate values and a branch metrics generator coupled to the phase estimator. The branch metrics generator has a generator segment for a phase space exhibiting a transfer function with first and second peaks respectively corresponding to the greater and lesser magnitude phase points, where the ratio of a phase space magnitude for the first likelihood peak divided by a phase space magnitude for the second likelihood peak is $R_{RX}$, and where $R_{RX}$ is less than $R_{TX}$. A decoder couples to the branch metrics generator.

The above and other advantages of the present invention are carried out in another form by a method for generating branch metrics. The method calls for generating phase estimates within a quantized phase space for a received data communication signal. In response to this generating activity, probabilities for detecting a phase estimate at each quantum in said quantized phase space are empirically determined. The probabilities form a probability density matrix. Log-likelihood values are calculated in response to the probability density matrix.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 2:
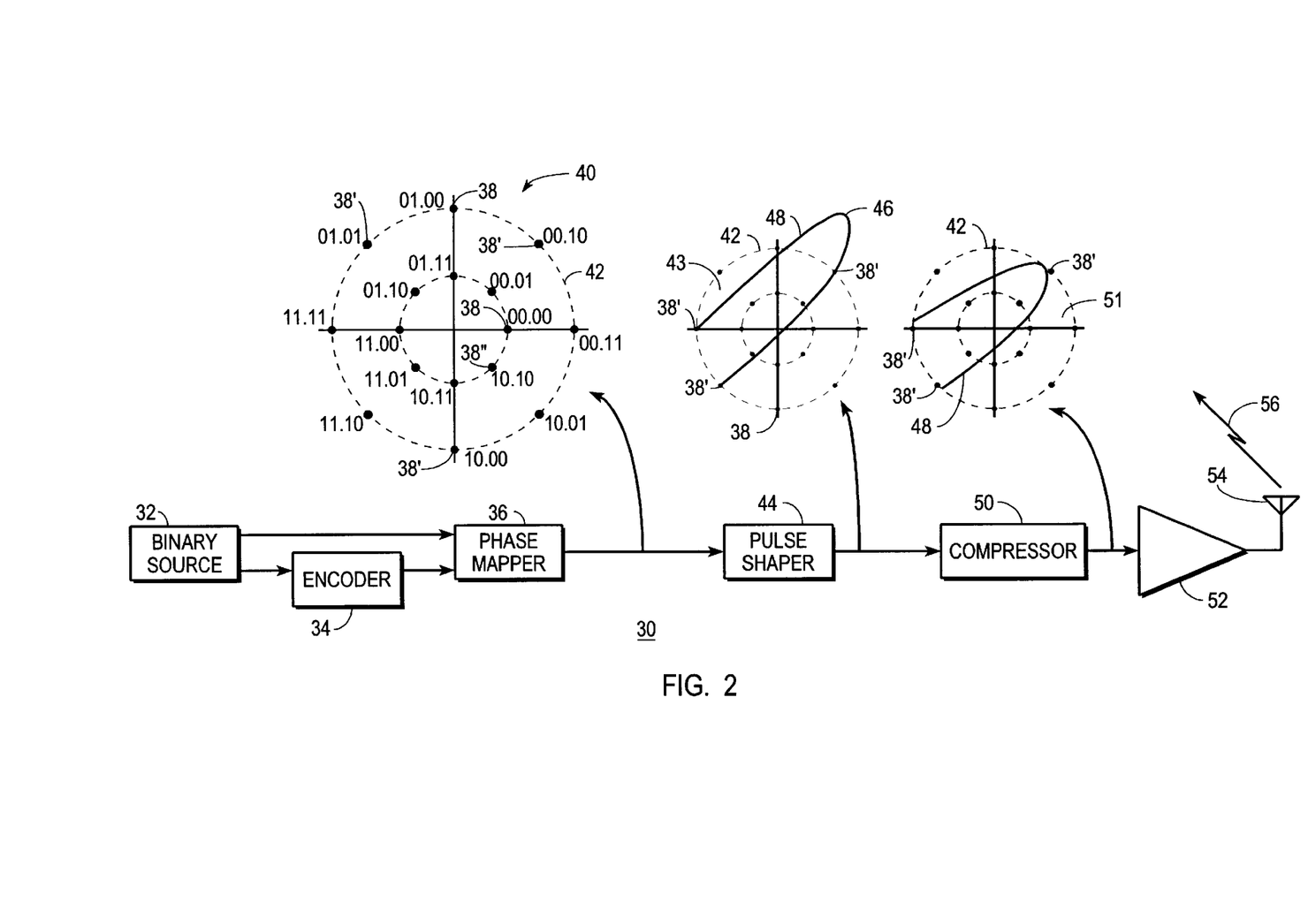
FIG. 2 shows a simplified block diagram of a digital communication transmitter.

FIG. 2 shows a simplified block diagram of a digital communications transmitter 30. Transmitter 30 includes a source 32 of binary data which are to be transmitted. Binary source 32 supplies at least a portion of its binary data to an encoder 34 to apply error correction. Encoded data generated by encoder 34 drive a phase mapper 36. Another portion of data from binary source 32 may bypass encoder 34 to drive phase mapper 36 with the encoded data so that a "pragmatic" data communication system results.

Encoder 34 implements any type of encoding which may be desirable for a particular data-communication application. Examples of suitable encoders include devices which implement block coding (e.g., Reed-Solomon), convolutional encoding (e.g., Viterbi), turbo encoding, or a combination thereof. Encoder 34 may also include such interleaving, puncturing, and pilot-data-insertion as may be desirable for particular applications. While virtually any type of encoding may be employed, encoder 34 in the preferred embodiment discussed herein applies rate one-half, convolutional encoding. Thus, notwithstanding any puncturing that may optionally be applied, encoder 34 generates two encoded bits for each input bit.

Phase mapper 36 translates data from encoder 34 and data which come from binary source 32 but bypass encoder 34 into a stream of phase points 38. Phase points 38 represent discrete states of a communication signal being digitally constructed by transmitter 30. This communication signal exhibits one phase point 38 at a time, and that phase point 38 is selected from a transmitter-implemented constellation 40 of phase points 38 in response to data being transmitted. Moreover, that phase point 38 is valid for a duration of a unit baud interval, after which the same or another phase point 38 becomes valid for a subsequent unit baud interval.

FIG. 2 illustrates an exemplary transmitter-implemented constellation 40 in connection with the output of phase mapper 36. Exemplary constellation 40 illustrates a sixteen state polar amplitude phase shift keyed (16-APSK) modulation scheme. The sixteen states are represented by sixteen phase points 38. The polar feature of constellation 40 results from having phase points 38 arranged in concentric rings, wherein outer rings have at least as many phase points as inner rings. The amplitude phase shift keyed feature of constellation 40 results from having phase points 38 exhibit diverse amplitudes and phases. However, transmitter-implemented constellation 40 need exhibit neither sixteen states nor a polar configuration. Square constellations, such as the 16-QAM example of FIG. 1, and other constellation shapes and different numbers of constellation states, such as 32, 64, 128, 256 and others are all within the scope of the present invention.

FIG. 2 further illustrates an exemplary coding scheme applied to phase points 38 in transmitter-implemented constellation 40. This coding scheme associates a unique four-bit code with each phase point 38. A radix point separates the two right bits from the two left bits to indicate that the right two bits of each four-bit code are encoded through encoder 34 while the left two bits of each four-bit code bypass encoder 34.

While having phase points 38 exhibit different amplitudes is not a requirement of the present invention, the advantages of the present invention are most pronounced on constellations in which phase points exhibit diverse amplitudes. In the 16-APSK example illustrated in FIG. 2, phase points 38 positioned on the outer ring of constellation 40, hereinafter referred to as a unit circle 42, are greater magnitude phase points 38', while phase points 38 positioned on the inner ring of constellation 40 are lesser magnitude phase points 38". In this exemplary embodiment, if greater magnitude phase points 38' exhibit a normalized magnitude of 1.000, then lesser magnitude phase points 38" desirably exhibit a magnitude of about 0.435. Hence, the ratio $R_{TX}$ of the magnitude of greater magnitude points 38' divided by the magnitude of lesser magnitude points 38" is about 2.3. These magnitudes and their absolute ratio are not critical parameters but are relevant in connection with corresponding parameters discussed below in connection with FIG. 3.

An output of phase mapper 36 couples to a pulse shaper 44. Pulse shaper 44 desirably implements a Nyquist-type filter. Such filters include Nyquist, root-Nyquist, raised cosine-rolloff, and others. Nyquist-type filters are desirable as they provide a spectrally constrained waveform and negligible inter-symbol interference. This is achieved by spreading the energy for a single phase point 38 over many unit baud intervals in such a manner that the energy from any given phase point 38 does not interfere with the energy from preceding and following phase points 38 at the appropriate baud-interval sampling instants.

The spectral constraints imposed by pulse shaper 44 are achieved at a cost of amplitude expansion. In particular, the communication signal described by the phase point data stream from phase mapper 36 exhibits only magnitudes less than or equal to unit circle 42. At the appropriate sampling instants, the outputs from pulse shaper 44 basically exhibit magnitudes in this range. However, the signal described by these samples may make large excursions beyond unit circle 42, and the excursions become larger as an excess bandwidth factor α diminishes.

A phase space 43 illustrated in connection with an output of pulse shaper 44 in FIG. 2 depicts an excursion 46 for an exemplary situation. Phase space 43 illustrates an exemplary locus 48 traversed by the communication signal output from pulse shaper 44 through three unit baud intervals. While the communication signal precisely passes through three phase points 38, its amplitude greatly exceeds unit circle 42. For an exemplary α value of 0.2, the maximum magnitude of the excursion 46 is approximately 1.8 times that of unit circle 42. Excursion 46 is greater when locus 48 traverses large phase angles between greater magnitude phase points 38' in consecutive unit baud intervals.

While the spectral constraint achieved by pulse shaper 44 is desirable, the amplitude expansion is not. The amplitude expansion, without correction, would require a power amplifier to linearly reproduce signals throughout the range from an amplitude of zero to the peak of a maximum excursion 46. Non-linearities in this range would cause spectral expansion, not to mention unwanted distortions. Such linear amplifiers tend to be more expensive than amplifiers which might be able to linearly reproduce signals throughout the range between an amplitude of zero and unit circle 42. Accordingly, the data stream from pulse shaper 44 is supplied to a compressor 50.

Compressor 50 compresses the amplitude of the communication signal defined by the data stream from pulse shaper 44. Desirably, compressor 50 performs its amplitude compression in a manner that substantially prevents spectral expansion. One example of a suitable compressor 50 is described in the above-referenced patent incorporated herein by reference.

A phase space 51 illustrated in connection with an output of compressor 50 in FIG. 2 depicts a compressed communication signal for the exemplary situation depicted in phase space 43. Locus 48 is now substantially confined within unit circle 42. However, locus 48 may not precisely pass through phase points 38 at the appropriate sampling instants. Accordingly, compressor 50 introduces a system-induced distortion into the communication signal, and this system-induced distortion intentionally causes the communication signal to fail to precisely exhibit the phase point values defined by transmitter-implemented constellation 40.

The compressed communication signal is fed from compressor 50 to an amplification section 52. Amplification section 52 may include a linearizer, digital-to-analog circuits, tuning circuits, and analog power amplification circuits. An output of amplification section 52 drives a feed port 54, from which a communication signal 56 emerges in order to propagate to a receiver. While communication signal 56 is an RF signal broadcast through space in the preferred embodiment, the present invention likewise applies to cable, fiber optic, wireline, and other transmission media.

Figure 3:
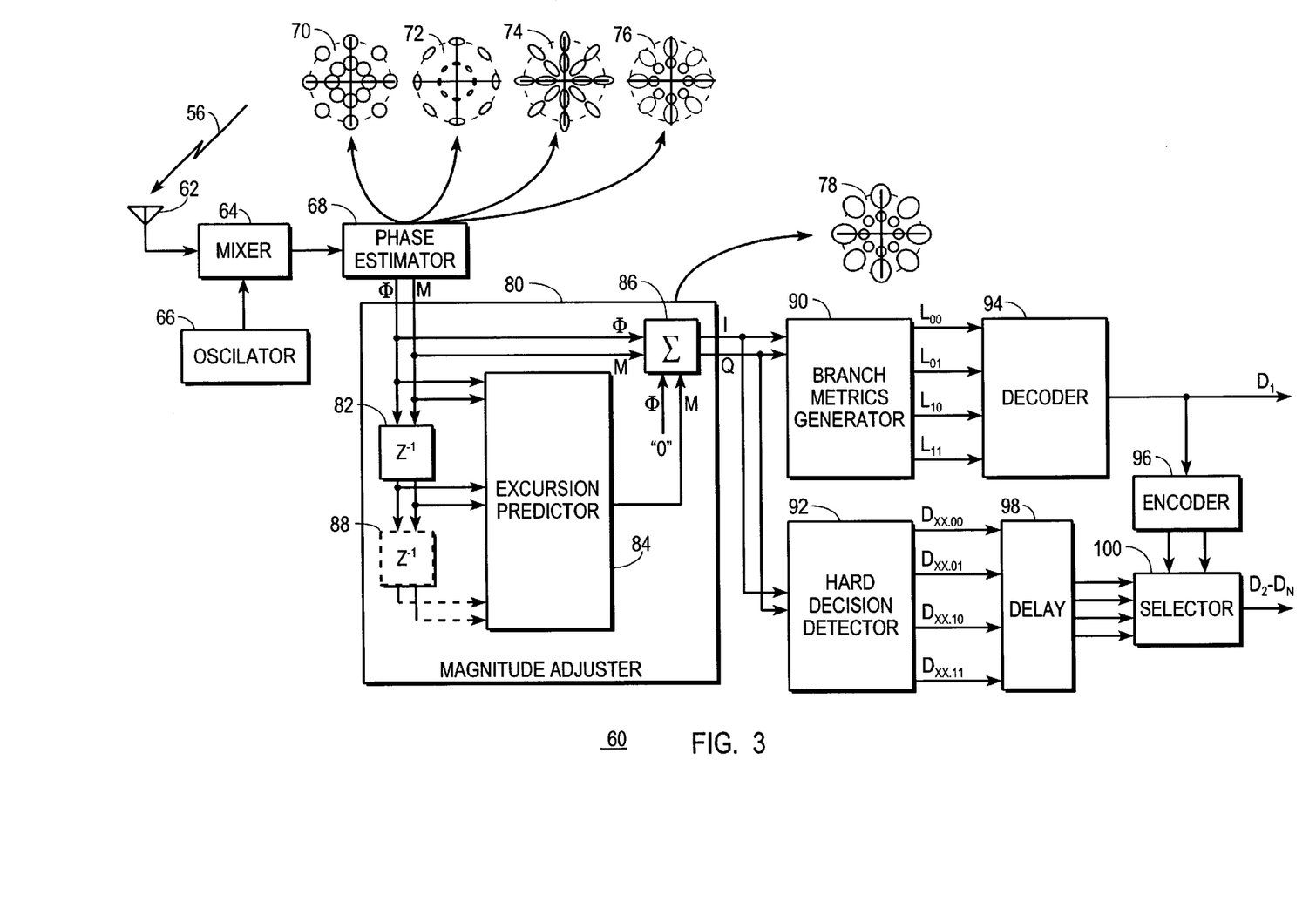
FIG. 3 shows a simplified block diagram of a digital communication receiver compatible with the transmitter of FIG. 2.

FIG. 3 shows a simplified block diagram of a digital communication receiver 60 compatible with transmitter 30 of FIG. 2. Communication signal 56 is received at a feed port 62 and passed after appropriate RF signal conditioning (not shown) to a first input of a mixer 64. An oscillator 66 couples to a second input of mixer 64 so that mixer 64 performs a down-conversion of the communication signal to an intermediate frequency (IF) or base band. This down-converted communication signal then passes to a phase estimator 68. Of course, the IF or base band communication signal processed by phase estimator 68 is not the same as the communication signal supplied to amplification section 52 of transmitter 30. This signal differs due to the presence of noise, often called additive white Gaussian noise (AWGN) in addition to other processing errors, such as quantization errors, amplification non-linearities, and local oscillator phase noise.

Phase estimator 68 includes circuits which translate this communication signal into a stream of phase estimates. Such circuits perform analog-to-digital conversion, adaptive equalization, carrier tracking, and unit baud interval synchronization. While more than one phase estimate may be provided for each unit baud interval, and unit baud interval synchronization achieved by adjusting interpolator filter parameters in a phase locked loop (not shown), for convenience the present discussion will assume that a single phase estimate value is supplied by phase estimator 68 per unit baud interval. The phase estimates represent locations in a phase space, such as phase spaces 70, 72, 74, 76, or 78 illustrated in FIG. 3.

Phase spaces 70, 72, 74, and 76 graphically illustrate different patterns of phase estimates likely to be generated by phase estimator 68 when communication signal 56 conveys data in accordance with transmitter-implemented constellation 40 (FIG. 2). The relative positions of phase points 38 illustrated in constellation 40 (FIG. 2) are called ideal phase points hereinbelow. Phase estimates generated by phase estimator 68 would be located only on the ideal phase points but for the presence of noise and system-induced distortions. Consequently, a phase estimate may be located anywhere in the phase space.

Phase space 70 depicts a pattern dominated by noise (e.g., AWGN). In phase space 70, phase estimates are equally likely to deviate from the ideal phase points in any direction, and each phase point has substantially the same probability of experiencing a deviation of a given magnitude. Circles illustrated in phase space 70 surrounding ideal phase points schematically indicate equal-probability contours within phase space 70. For a massive quantity of received random data, a given percentage of the phase estimates fall within the circles. Approximately one-half of the phase estimates corresponding to greater magnitude phase points 38' (FIG. 2) reside outside unit circle 42.

Phase space 72 depicts a pattern dominated by carrier phase jitter, primarily as a result of the operation of a carrier tracking loop (not shown) in receiver 60. Phase estimates are more likely to deviate from the ideal phase points in a tangential direction than a radial direction. Accordingly, equal-probability contours now appear more elliptical than in phase space 70, with a major axis tangentially aligned in phase space 72. Moreover, equal-probability contours for greater magnitude phase points 38' (see FIG. 2) overlie a greater area of phase space 72 than equal-probability contours for lesser magnitude phase points 38" (see FIG. 2). Approximately one-half of the phase estimates corresponding to greater magnitude phase points 38' reside outside unit circle 42.

Phase space 74 depicts a pattern dominated by unit baud interval synchronization phase jitter, primarily as a result of the operation of a unit baud interval tracking loop (not shown) in receiver 60. Phase estimates are more likely to deviate from the ideal phase points in a radial direction than a tangential direction. Accordingly, equal-probability contours now appear more elliptical than in phase space 70, with a major axis radially aligned in phase space 74. Approximately one-half of the phase estimates corresponding to greater magnitude phase points 38' (FIG. 2) reside outside unit circle 42.

Phase space 76 depicts a pattern dominated by compression distortion, primarily as a result of the operation of compressor 50 in transmitter 30. Equal-probability contours tend to appear somewhat elliptical for greater magnitude phase points 38' (FIG. 2) and elongated in a radial direction of phase space 76. However, for lesser magnitude phase points 38" (FIG. 2) equal-probability contours are less elliptical. Moreover, equal-probability contours for greater magnitude phase points 38' overlie a significantly greater area of phase space 76 than equal-probability contours for-lesser magnitude phase points 38". The vast majority of phase estimates corresponding to greater magnitude phase points 38' (FIG. 2) reside inside unit circle 42.

Phase spaces 72, 74, and 76 illustrate examples of system-induced distortions. For system-induced distortions, the resulting phase error has a significant non-random component. Moreover, while phase spaces 70, 72, 74, and 76 depict patterns dominated by individual sources of error, in a given single application multiple error sources may be more or less equally dominant so that the resulting pattern is a combination of patterns similar to those depicted in FIG. 3. In particular, while the AWGN pattern of phase space 70 may quickly become dominant in a noisy environment, the compressor-induced pattern of phase space 76 can be equally dominant, even in a noisy environment.

The phase estimate stream from phase estimator 68 is routed to a magnitude adjuster 80 in the preferred embodiment. For convenience, FIG. 3 illustrates a polar notation where the phase estimates are represented as having phase (Φ) and magnitude (M) components. However, rectilinear notation, where the phase estimates are represented as having in-phase (I) and quadrature (Q) components may also be used.

Magnitude adjuster 80 distorts selected received phase estimates from the phase estimate stream by increasing the magnitude component of the selected phase estimates. Within magnitude adjuster 80 the complex phase estimate stream is routed to an input of a one-baud delay element 82, an input of an excursion predictor 84 and to an input of a summation circuit 86. An output of delay element 82 couples to a second input of excursion predictor 84 and to an optional one-baud delay element 88, if present. An output of delay element 88, if present, couples to a third input of excursion predictor 84. Summation circuit 86 couples to excursion predictor 84 so that an output from excursion predictor 84 is added to the magnitude component (M) while the phase component (Φ) remains unchanged. Accordingly, magnitude adjuster 80 is configured so that the magnitude component (M) of a current phase estimate stream is adjusted as a function of the current phase estimate and the immediately previous phase estimate or two.

Magnitude adjuster 80 is provided to compensate, to some degree, for the system-induced distortion imposed by the operation of compressor 50 (FIG. 2). As graphically illustrated in phase space 76, the vast majority of phase estimates corresponding to greater magnitude phase points 38' (FIG. 2) reside inside unit circle 42. This feature results from the occasional compression of excursions 46 (FIG. 2) in compressor 50, and it causes the relative Euclidean distances between the equal probability contours in receiver phase space 76 to be smaller than they would be without the operation of compressor 50. In other words, they tend to reduce the ability of receiver 60 to distinguish between transmitted phase states, thereby tending to reduce performance.

Excursions 46 occur when loci 48 (FIG. 2) traverse large phase angles between greater magnitude phase points 38' in consecutive unit baud intervals. Accordingly, excursion predictor 84 is desirably configured to predict such occurrences. Excursion predictor 84 is desirably implemented using logic circuits which compare the difference in phase over two or three unit baud intervals with thresholds, and compare magnitudes from the same unit baud intervals with thresholds to make predictions concerning whether excursions 46 were compressed in compressor 50 and the amount by which the magnitude component of a current phase estimate should be increased to compensate therefor. For example, excursion predictor 84 may increase the magnitude component by a given predetermined amount "X" when the phase component has changed between 160° and 180° and the magnitude has been greater than 0.6, normalized to unit circle 42, on each of the previous and current unit baud intervals. Other decision metric equations may also be applied. Precision in decision metrics within excursion predictor 84 is not required because excursion predictor 84 operates upon a noisy signal. Any decision metric which more often improves than diminishes the ability to decode is likely to yield performance improvements.

FIG. 3 depicts the magnitude-adjusted phase estimate stream output from magnitude adjuster 80 in rectilinear I,Q form for convenience, but a polar notation may also be used. This phase estimate stream is routed to a branch metrics generator 90 and to a hard decision detector 92. It may produce phase estimates which are graphically depicted in phase space 78. In comparing phase space 78 with phase space 76, the phase estimates from greater magnitude phase points 38' are not displaced as much radially inward, but equal-probability contours continue to appear somewhat elliptical for greater magnitude phase points 38' (FIG. 2) and elongated in a radial direction. Lesser magnitude phase point equal-probability contours continue to appear less elliptical and are smaller than the equal-probability contours for greater magnitude phase points 38'. Accordingly, phase space 78 continues to exhibit significant non-random components, but some of the features of phase space 76 have been compensated.

Branch metrics generator 90 has segments which implement transfer functions for describing the likelihoods of a given phase estimate conveying encoded data of: 00, 01, 10 and 11. Each segment has an output which couples to a decoder 94. Branch metrics generator 90 may be implemented by a look-up table, but phase space sector rotation circuits may be included to reduce the amount of memory required by taking advantage of symmetries in the transfer functions. Branch metrics generator 90 and its transfer functions are described in more detail below.

Decoder 94 complements encoder 34 (FIG. 2) In the preferred embodiment decoder 94 includes an example of the well-known Viterbi decoder. However, decoder 94 may also include circuits for de-interleaving and de-puncturing as may be required in specific applications. In the preferred embodiment, decoder 94 generates a single data bit ($D_1$) per unit baud interval. This single data bit per unit baud interval is fed to an encoder 96, which preferably is identical to encoder 34, to generate two encoded symbols per unit baud interval.

Hard decision detector 92 implements a look-up function to identify four alternative sets of uncoded data based upon each phase estimate. One uncoded data set represents the uncoded data conveyed when the encoded bits are 00, another represents the uncoded data conveyed when encoded bits are 01, another represents the uncoded data conveyed when encoded bits are 10, and the other represents the uncoded data conveyed when encoded bits are 11. The alternative four sets of uncoded data are routed through a delay element 98 and passed to a selector circuit 100. Delay element 98 implements a delay so that the four alternative sets of uncoded data arrive at selector 100 at the same instant as corresponding symbols from encoder 96. Selector 100 selects one of the four alternative sets of uncoded data for an output based upon the encoded data from encoder 96.

Figure 4:
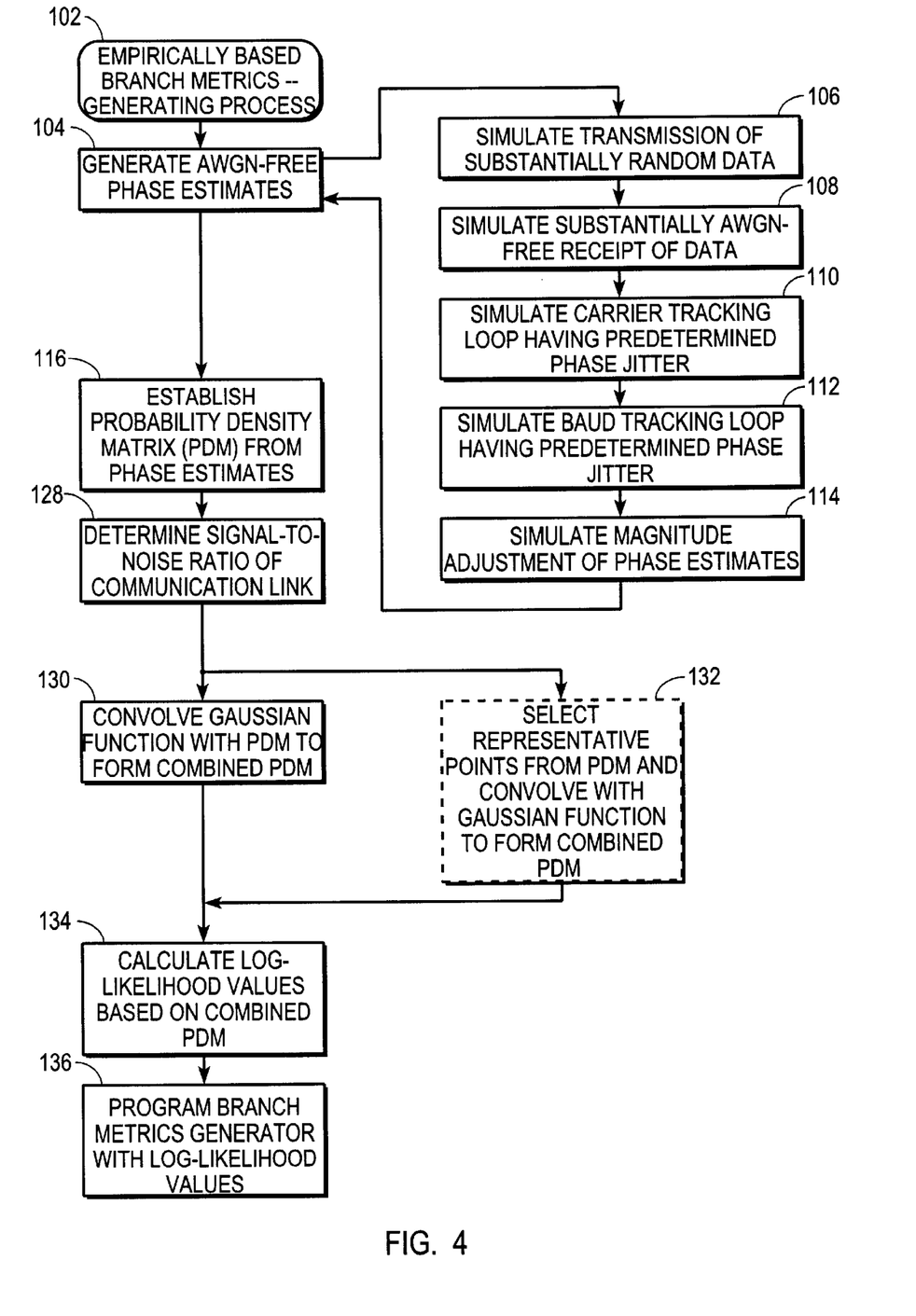
FIG. 4 shows a flow chart of an empirically based branch metrics generating process configured in accordance with the teaching of the present invention.

FIG. 4 shows a flow chart of an empirically based branch metrics generating process 102 configured in accordance with the teaching of the present invention. Process 102 is used to generate branch metric transfer functions that are responsive to both non-random and random components of phase estimate patterns. Process 102 is performed once prior to actual normal operation of transmitter 30 and receiver 60 for each set of conditions which define a modulation type and order and define transmitter and receiver parameters. The resulting branch metric transfer functions are then programmed into branch metrics generator 90 (FIG. 3).

Process 102 includes a task 104 for generating phase estimates, such as phase estimates available at the output of magnitude adjuster 80 (FIG. 3). Task 104 may be implemented using test or prototype transmitter 30 and receiver 60 hardware, but the preferred embodiment of process 102 utilizes simulations. For the purposes of task 104, the phase estimates are generated for a communication link environment in which AWGN is significantly lower than may be present at-worst case design parameters. Preferably, AWGN is substantially eliminated for task 104. Accordingly, system-induced distortions rather than noise will dominate equal probability contours in the receiver phase space.

The implementation of task 104 by simulation may rely upon a subtask 106. Subtask 106 simulates the transmission of substantially random data. Desirably, transmitter 30 (FIG. 2) is simulated, and the simulation is operated to virtually transmit a massive amount of data, preferably in the billions of bits, so that a wide variety of bit stream combinations will be simulated.

The implementation of task 104 by simulation may also rely upon a subtask 108. Subtask 108 simulates the substantially AWGN-free receipt of the data whose transmission is simulated in task 106. Nothing is done at this point to simulate the corruption of simulated communication signal 56 (FIGS. 2–3) with AWGN so that a high signal-to-noise ratio is simulated for the communication link relative to worst case design parameters. In addition, a subtask 110 simulates a carrier tracking loop, which is included in phase estimator 68 (FIG. 3) and which exhibits a predetermined amount of phase jitter, a subtask 112 simulates a unit baud interval tracking loop which is included in phase estimator 68 and has a predetermined amount of phase jitter, and a subtask 114 simulates the operation of magnitude adjuster 80 (FIG. 3) to selectively make magnitude adjustments which compensate in part for the operation of compressor 50 (FIG. 2). While the flow chart of FIG. 4 depicts subtasks 106, 108, 110, 112, and 114 as occurring sequentially, such tasks may also be implemented to occur concurrently.

The result of task 104, whether or not implemented through the simulation subtasks of 106, 108, 110, 112 and 114, is indicated in a task 116. Task 116 establishes an empirically determined probability density matrix (PDM) from received phase estimates generated by task 104.

Figure 5:
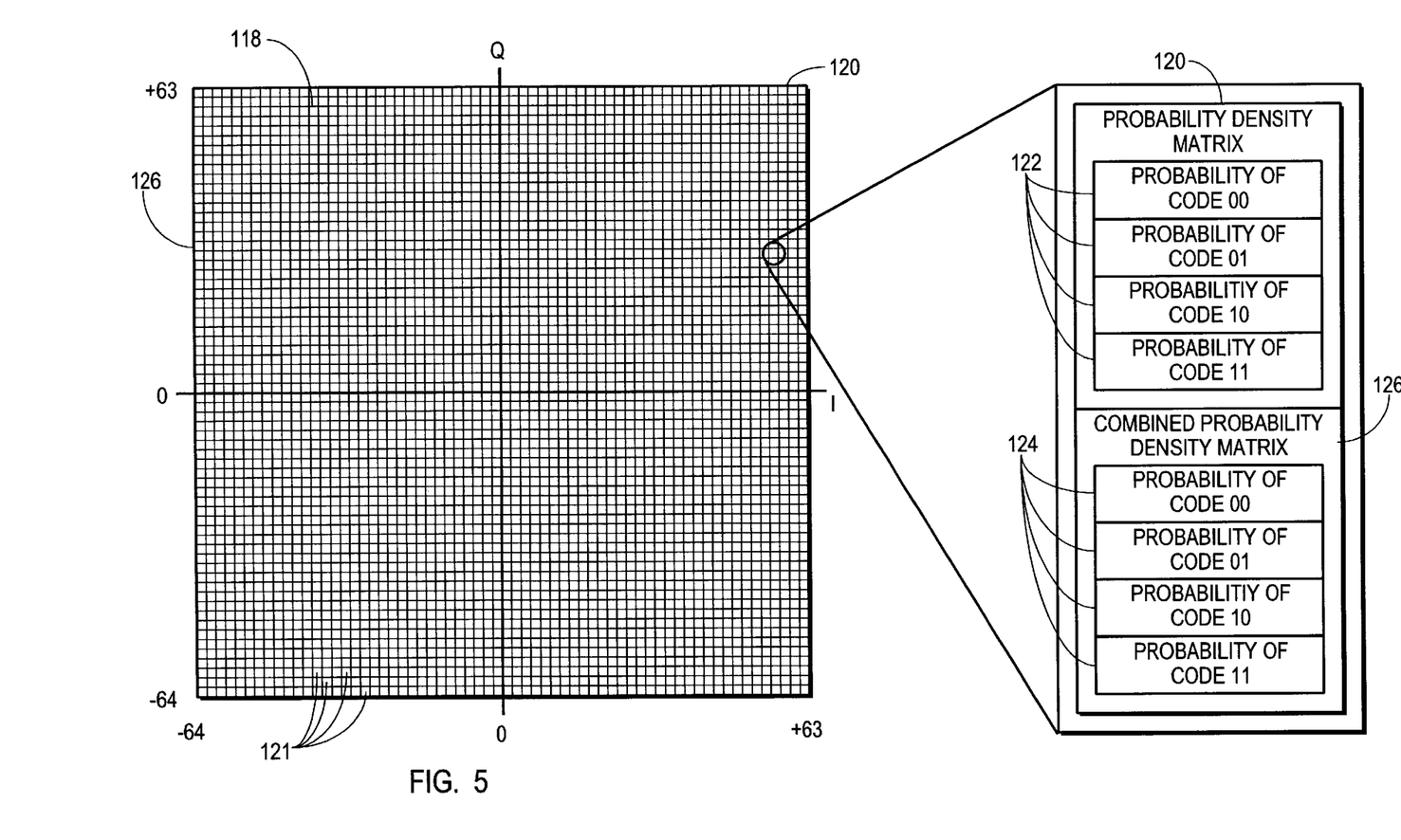
FIG. 5 shows a schematic representation of a quantized phase space and a corresponding probability density matrix based thereon.

FIG. 5 shows a schematic representation of a quantized phase space 118 and a corresponding probability density matrix 120 based thereon, as may be established by the operation of task 116. FIG. 5 depicts phase space 118 as being partitioned into a multiplicity of fundamental unit areas 121, referred herein as quanta. In the example depicted in FIG. 5, seven bits of quantization are provided along each of the I and Q axes, resulting in a quantization of 16,385 fundamental unit areas or quanta, but different embodiments can use different levels of quantization. Each phase estimate identifies a single quantum from phase space 118.

PDM 120 results because several data elements are associated with each quantum of phase space 118. For example, four data elements 122 may be provided to count the numbers of occurrences of each phase estimate quantum for the transmitted encoded bit states of 00, 01, 10, and 11. Four data elements 124 may be provided to accommodate a combined noise and system-induced distortion PDM 126, discussed below, for the four encoded bit states.

Referring to FIGS. 4 and 5, task 116 may simply count the number of occurrences of each resulting generated phase estimate quantum during task 104 for the different encoded bit states. Task 116 may then divide the resulting totals by the respective overall totals to arrive at values that describe the probabilities of receiving each phase estimate quantum for the different transmitted encoded bit states. A combination of one or more of the patterns depicted in phase spaces 72, 74, 76, and 78 (FIG. 3) emerges in phase space 118 from the operation of task 116 (FIG. 4). However, depending on specific design parameters for carrier tracking loops, unit interval tracking loops, and magnitude adjuster 80, the precise pattern will vary. Accordingly, task 116 causes PDM 120 to set forth empirically determined probabilities for detecting a phase estimate at each quantum of phase space 118. The probabilities are empirically determined through real world operation of test or prototype equipment or by simulation.

Following task 116, a task 128 determines a signal-to-noise (S/N) ratio appropriate for the real world communication link through which communication signal 56 (FIGS. 2–3) propagates. This S/N ratio is desirably much lower than used above in task 104 and subtask 108. Following task 128, a task 130 performs a three-dimensional convolution operation between a suitable noise function and PDM 120. The results are stored in combined noise and system-induced distortion PDM 126. In the preferred embodiment, the noise function is a Gaussian function with a variance set in response to the S/N ratio obtained above in task 128.

As an alternative to task 130, process 102 may include an optional task 132 following task 128. Optional task 132 achieves an approximation of the results achieved by task 130. In task 132, representative phase points (i.e., phase estimate quanta) from PDM 120 are selected and treated as ideal phase points. The representative phase points are centrally located within the resulting equal probability contours depicted in phase space 118. These representative phase points need not occupy the same relative locations in phase space 118 as phase points 38 occupy in constellation 40 (FIG. 2). In fact, representative phase points corresponding to greater magnitude phase points 38' (FIG. 2) will be displaced radially inward in phase space 118 to compensate for the system-induced distortion caused by compressor 50 (FIG. 2). After selecting representative phase points, task 132 assumes that all received phase estimates would occur only at the representative phase points but for the presence of AWGN, and convolves a probability of one at the representative phase points with a suitable noise function, such as used in task 130. Of course, the convolution of an impulse function with a Gaussian function may be implicitly performed because the result simply resembles the Gaussian function. The results of the convolution, whether performed implicitly or explicitly, are stored in combined PDM 126.

After task 130 or 132, a task 134 calculates log-likelihood ratio values based upon combined PDM 126 using conventional techniques summarized below in equation 1.

$$(LLR)_j = \text{Log}\left[\frac{\sum_{i \in S_j^{+1}} Pr\{R | T = C^i\}}{\sum_{i \in S_j^{-1}} Pr\{R | T = C^i\}}\right] \quad \text{Eq. 1}$$

where, $(LLR)_j$=Log-Likelihood Ratio for a decision j;

R=received phase estimate sequence of {I,Q}
 =T+E;

T=Transmitted sequence of {I,Q} values
 =$(t_1, t_2, \ldots, t_n)$;

$C^i$=phase estimate corresponding to the $i^{th}$ code word
 =$(c^i_1, c^i_2, \ldots, c^i_n)$;

$S_j^{+1}$=the set containing the index of code words such that $c^i_j$=+1; and $S_j^{-1}$=the set containing the index of code words such that $c^i_j$=−1.

The numerators and denominators for equation 1 may be obtained from combined PDM 126.

Following the calculation of log-likelihood values in task 134, a task 136 is performed to program branch metrics generator 90 (FIG. 3) with the branch metric transfer functions calculated in task 134.

Figure 6:
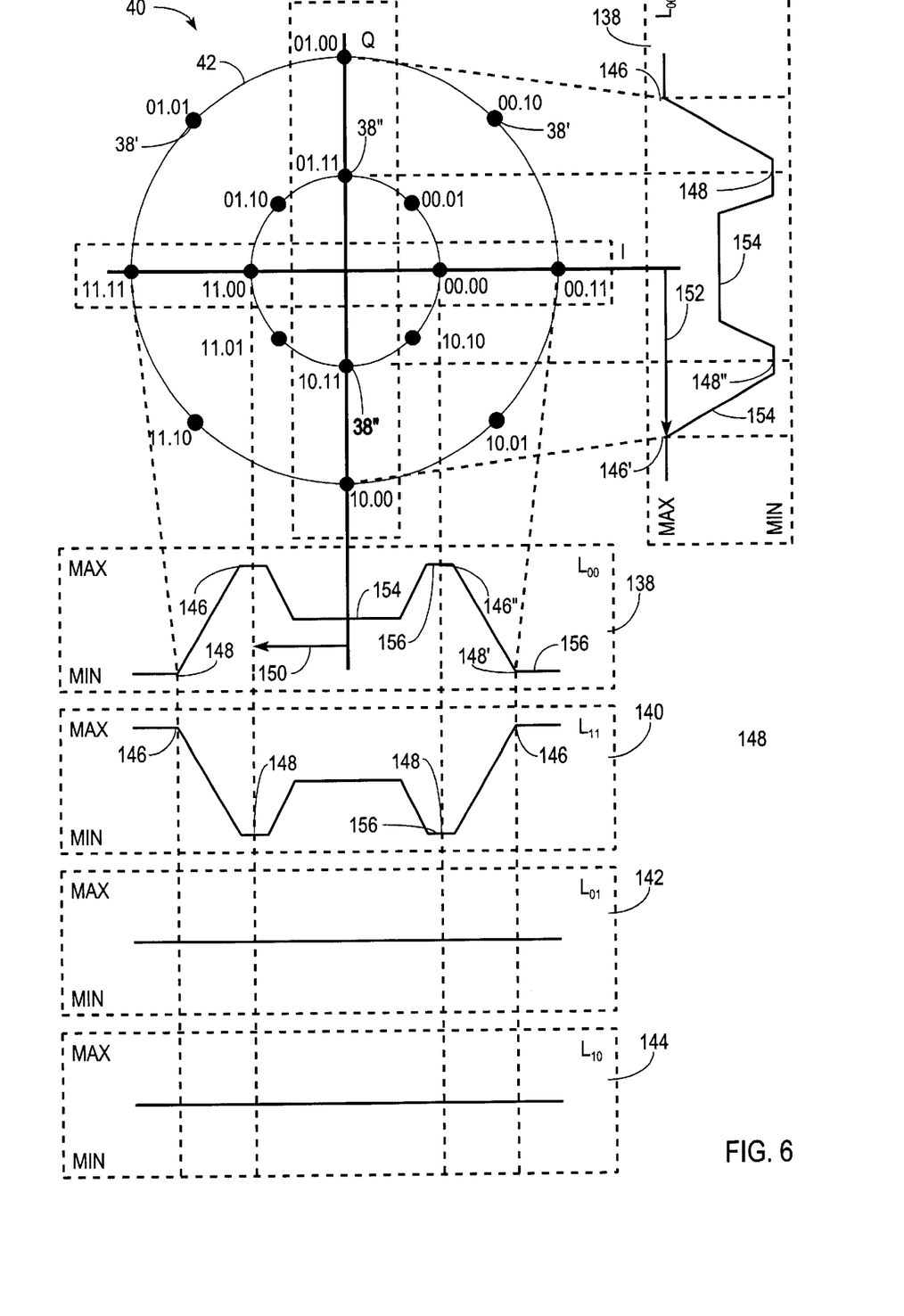
FIG. 6 shows a transmitter-implemented phase constellation and corresponding transfer functions for branch metric segments implemented in the receiver of FIG. 3 in accordance with the teaching of the present invention.

FIG. 6 shows transmitter-implemented phase constellation 40 in comparison with corresponding exemplary transfer functions for branch metric segments implemented in branch metrics generator 90 of receiver 60 (FIG. 3). In particular, FIG. 6 depicts a situation resulting from the generation of branch metric transfer functions in accordance with process 102 (FIG. 4) when a significant portion of system-induced distortion is caused by the operation of compressor 50 (FIG. 2).

FIG. 6 graphically depicts a contour at Q=0 of an exemplary branch metric transfer function for branch metric segments 138, 140, 142, and 144. Segment 138 provides an output describing likelihoods of the encoded data state of 00 having been transmitted for all quanta in phase space 118 (FIG. 5). Segment 140 provides an output describing likelihoods of the encoded data state of 11 having been transmitted for all quanta in phase space 118. Segment 142 provides an output describing likelihoods of the encoded data state of 01 having been transmitted for all quanta in phase space 118, and segment 144 provides an output describing likelihoods of the encoded data state of 10 having been transmitted for all quanta in phase space 118. FIG. 6 also shows a contour at I=0 for segment 138. Each segment 138, 140, 142, and 144 presents a transfer function between a phase estimate, which may be distorted through magnitude adjuster 80 (FIG. 3), and likelihood values for encoded bits which exhibit a common value (i.e., the same encoded bit state).

Those skilled in the art will appreciate that different contours of segments 138, 140, 142, and 144 will exhibit different shapes, and that in any event shapes for similar contours will be different for different modulation orders and types and for different system-induced distortions characterized through empirically based branch metric generation process 102 (FIG. 4).

As illustrated by segments 138, 140, 142, and 144, the branch metric transfer functions vary between maximum likelihood values, or peaks, 146 and minimum likelihood values, or valleys, 148. Maximum likelihood values are greater than or equal to all other likelihoods in the segment 138, 140, 142, or 144. Minimum likelihood values are less than or equal to all other likelihoods in the segment 138, 140, 142, or 144. Peaks and valleys 146 and 148 correspond to phase points 38 in transmitter-implemented constellation 40. Within segment 138, peaks 146' correspond to greater magnitude phase points 38', peaks 146" correspond to lesser magnitude phase points 38", valleys 148' correspond to greater magnitude phase points 38', and valleys 148" correspond to lesser magnitude phase points 38". Non-maximum likelihood regions 154 reside between likelihood peaks 146 and likelihood valleys 148.

Peaks and valleys 146 and 148 may reside in receiver phase space within a region 156 wherein all phase estimate quanta exhibit substantially the same maximum or minimum values. In such cases, peaks and valleys 146 and 148 may be viewed as occurring in the central portions of such regions. However, if such regions reside at the outer periphery of the receiver phase space, the peak or valley may then be viewed as occurring at the inward edge of the region because the outer edge may be extended indefinitely.

However, peaks and valleys 146 and 148 need not reside at the same relative locations in receiver phase space where phase points 38 reside in transmitter phase space. Segments 138, 140, 142, and 144 are depicted in FIG. 6 as being scaled so that peaks and valleys 146 and 148 which correspond to lesser magnitude phase points 38" have substantially the same magnitude 150 in receiver phase space as lesser magnitude phase points 38" exhibit in transmitter phase space. However, at this level of scaling, peaks and valleys 146 and 148 which correspond to greater magnitude phase points 38' have substantially less magnitude 152 in receiver phase space than greater magnitude phase points 38' exhibit in transmitter phase space.

In other words, the ratio $R_{RX}$ of magnitude 152 divided by magnitude 150, as expressed in transfer functions implemented in branch metric generator 90, is less than a corresponding ratio $R_{TX}$ for constellation 40. As discussed above, $R_{TX}$ is about 2.3 in the preferred embodiment. Accordingly, $R_{RX}$ is less than 2.3 in the preferred embodiment. The difference between $R_{TX}$ and $R_{RX}$ occurs to compensate for non-random system-induced distortion. In particular, compressor 50 introduces a type of distortion which displaces received phase estimates for certain greater magnitude phase points 38" radially inward in the receiver phase space. Process 102 (FIG. 4) along with the branch metric transfer functions derived therefrom compensate for this and other types of system-induced distortions.

In summary, the present invention provides an improved distortion-compensated digital communication receiver and method. The digital communication receiver is configured to accommodate non-random components of error in phase estimates generated in the receiver as well as random components of phase error. More specifically, a branch metrics generator accommodates non-random components of phase error as well as random components of phase error. In addition, an empirically-based method is provided for calculating branch metrics to accommodate non-random components of phase error.

Although the preferred embodiments of the present invention have been illustrated and described in detail, it will be readily apparent to those skilled in the art that various modifications and equivalents may be made therein without departing from the spirit of the invention or from the scope of the appended claims.

What is claimed is:

1. A distortion-compensated receiver for digital communication configured in accordance with a transmitter-implemented constellation having greater magnitude and lesser magnitude phase points, wherein the ratio of a magnitude of said greater magnitude phase point divided by a magnitude of said lesser magnitude phase point is $R_{TX}$, and said distortion-compensated receiver comprises:
   a phase estimator configured to supply phase estimate values;
   a branch metrics generator, coupled to said phase estimator, and having a generator segment for a phase space exhibiting a transfer function with first and second likelihood peaks respectively corresponding to said greater and lesser magnitude phase points, wherein the ratio of a phase space magnitude for said first likelihood peak divided by a phase space magnitude for said second likelihood peak is $R_{RX}$, where $R_{RX}$ is less than $R_{TX}$; and
   a decoder coupled to said branch metrics generator.

2. A distortion-compensated receiver as claimed in claim 1 additionally comprising a magnitude adjuster coupled between said phase estimator and said branch metrics generator, said magnitude adjuster being configured to distort a selected received phase estimate by increasing a magnitude parameter of said selected received phase estimate.

3. A distortion-compensated receiver as claimed in claim 2 wherein said magnitude adjuster is configured so that said selected phase estimate is identified in response to a change in a phase parameter between said selected received phase estimate and a prior received phase estimate.

4. A distortion-compensated receiver as claimed in claim 1 wherein said branch metrics generator is configured to provide likelihood values for an APSK phase constellation.

5. A distortion-compensated receiver as claimed in claim 1 wherein:
   first and second codes each having at least one error-correction-encoded bit are assigned to said greater magnitude and lesser magnitude phase points of said transmitter-implemented constellation; and
   said at least one error-correction-encoded bit has a common value in said first and second codes.

6. A distortion-compensated receiver as claimed in claim 1 wherein said generator segment is configured so that said phase space exhibits a non-maximum likelihood region between said likelihood peaks.

7. A distortion-compensated receiver as claimed in claim 1 wherein:
   said generator segment is a first generator segment which generates likelihoods for a first common code in response to said phase estimate values; and
   said branch metrics generator additionally comprises second, third, and fourth generator segments which respectively generate likelihoods for second, third, and fourth common codes in response to said phase estimate values.

8. A distortion-compensated receiver as claimed in claim 1 wherein:
   said branch metrics generator is configured so that said first and second likelihood peaks of said phase space reside in said phase space where likelihood values are greater than or equal to likelihood values at all other locations in said phase space; and
   said likelihood values of said phase space are calculated in response to a probability density matrix, said probability density matrix setting forth empirically determined probabilities for detecting a phase estimate at each of a multiplicity of quanta in said phase space.

9. A distortion-compensated receiver for digital communication, said receiver comprising:
   a phase estimator;
   a magnitude adjuster coupled to said phase estimator, said magnitude adjuster being configured to distort a selected received phase estimate by increasing a magnitude parameter of said selected received phase estimate to produce a distorted phase estimate;
   a branch metrics generator coupled to said magnitude adjuster to receive said distorted phase estimate; and
   a decoder coupled to said branch metrics generator.

10. A distortion-compensated receiver as claimed in claim 9 wherein said magnitude adjuster is configured so that said selected phase estimate is identified in response to a change in a phase parameter between said selected received phase estimate and a prior received phase estimate.

11. A distortion-compensated receiver as claimed in claim 9 wherein:
    said digital communication is configured in accordance with a transmitter-implemented constellation having greater magnitude and lesser magnitude phase points, wherein the ratio of a magnitude of said greater magnitude phase point divided by a magnitude of said lesser magnitude phase point is $R_{TX}$; and
    said branch metrics generator includes a generator segment for a phase space exhibiting a transfer function with first and second likelihood peaks respectively corresponding to said greater and lesser magnitude phase points, wherein the ratio of a phase space magnitude for said first likelihood peak divided by a phase space magnitude for a said second likelihood peak is $R_{RX}$, where $R_{RX}$ is less than $R_{TX}$.

12. A distortion-compensated receiver comprising:
    a phase estimator;
    a branch metrics generator coupled to said phase estimator, said branch metrics generator having log-likelihood values calculated in response to a probability density matrix, said probability density matrix setting forth empirically determined probabilities for detecting a phase estimate at each quantum in a quantized phase space; and
    a decoder coupled to said branch metrics generator.

13. A method for producing branch metrics in a digital communication system comprising:
    receiving a digital communication signal configured in accordance with a transmitter-implemented constellation having greater magnitude and lesser magnitude phase points, wherein the ratio of a magnitude of said greater magnitude phase point divided by a magnitude of said lesser magnitude phase point is $R_{TX}$;
    translating said digital communication signal into a stream of phase estimate values within a phase space; and
    generating likelihood values in response to said phase estimate values, wherein said likelihood values are associated with a phase space exhibiting a transfer function with first and second likelihood peaks respectively corresponding to said greater and lesser magnitude phase points, wherein the ratio of a phase space magnitude for said first likelihood peak divided by a phase space magnitude for a said second likelihood peak is $R_{RX}$, where $R_{RX}$ is less than $R_{TX}$.

14. A method for generating branch metrics comprising:

generating phase estimates within a quantized phase space for a received data communication signal;

empirically determining, in response to said generating activity, probabilities for detecting a phase estimate at each quantum in said quantized phase space, said probabilities forming a probability density matrix; and calculating log-likelihood values in response to said probability density matrix.

15. A method as claimed in claim 14 wherein said generating and determining activities are performed via simulation.

16. A method as claimed in claim 15 wherein said simulation is configured so that said received data communication signal is substantially free of noise and conveys substantially random data.

17. A method as claimed in claim 14 wherein:

said log-likelihood values are calculated in accordance with a predetermined signal-to-noise ratio; and said generating and determining activities are performed using a signal-to-noise ratio greater than said predetermined signal-to-noise ratio.

18. A method as claimed in claim 14 wherein said received data communication signal conveys substantially random data.

19. A method as claimed in claim 14 wherein:

said probabilities characterize system-induced distortions;

said method additionally comprises convolving said probability density matrix with a noise function configured in response to a predetermined signal-to-noise ratio for a transmission channel to generate a combined system-induced distortion and channel noise probability matrix; and said calculating activity is performed in response to said combined probability matrix.

20. A method as claimed in claim 19 wherein said noise function is a three-dimensional Gaussian function having a variance determined in response to said predetermined signal-to-noise ratio.

21. A method as claimed in claim 14 wherein:

said probabilities characterize system-induced distortions;

said method additionally comprises convolving values associated with phase space points selected in response to said probability density matrix with a noise function configured in response to a predetermined signal-to-noise ratio for a transmission channel to generate a combined system-induced distortion and channel noise probability matrix; and said calculating activity is performed in response to said combined probability matrix.

* * * * *